(No Model.) 2 Sheets—Sheet 2.
V. VON WEDELSTAEDT.
METHOD OF AND APPARATUS FOR LEARNING TO PLAY ON THE PIANO.
No. 370,750. Patented Sept. 27, 1887.
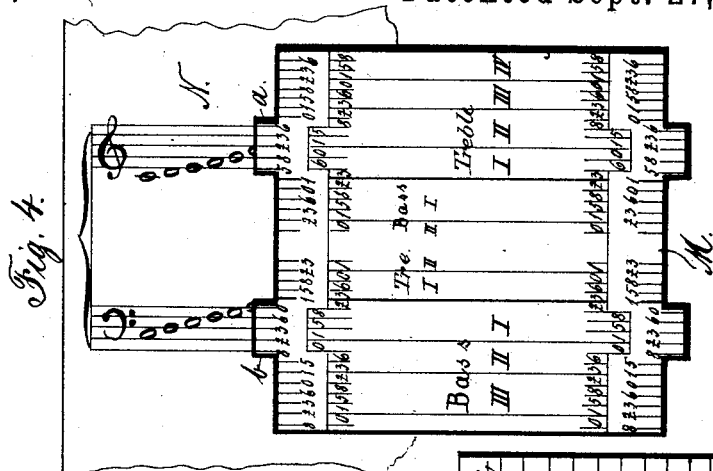
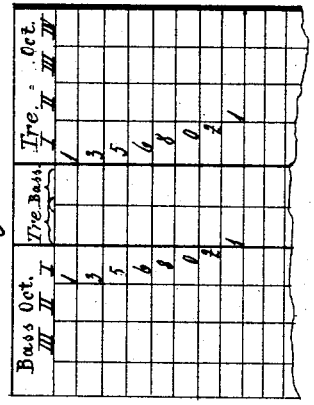
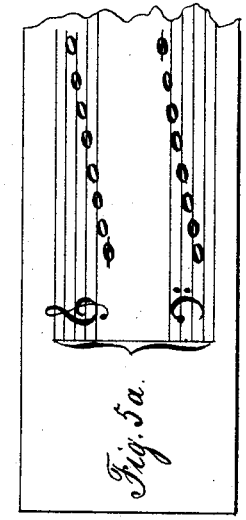
Witnesses.
J. A. Rutherford
Robt. Earrett
Inventor.
Victor von Wedelstaedt.
By James L. Norris
Atty.

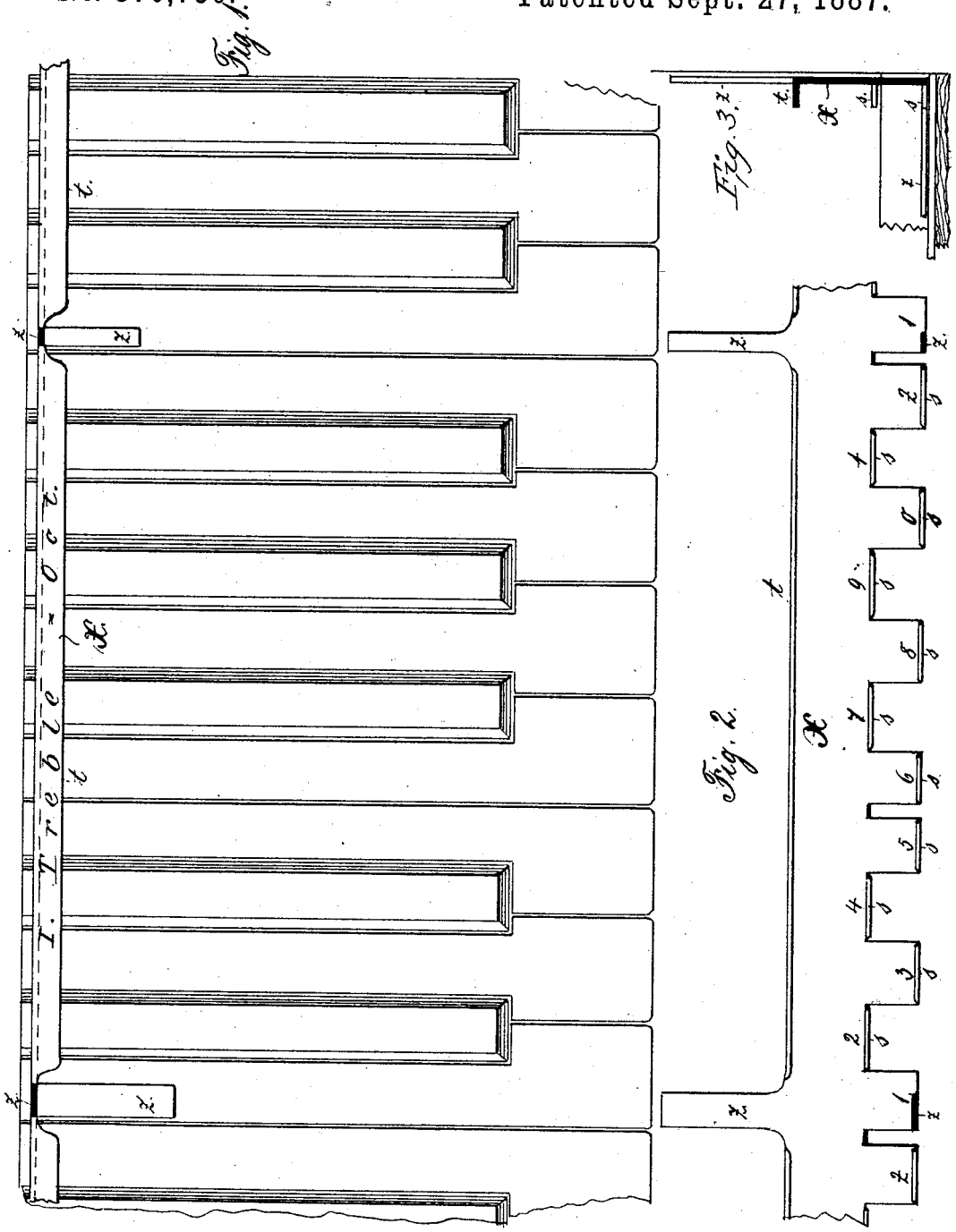

UNITED STATES PATENT OFFICE.

VICTOR VON WEDELSTAEDT, OF BERLIN, GERMANY.

METHOD OF AND APPARATUS FOR LEARNING TO PLAY ON THE PIANO.

SPECIFICATION forming part of Letters Patent No. 370,750, dated September 27, 1887.

Application filed May 4, 1887. Serial No. 237,116. (No model.)

*To all whom it may concern:*

Be it known that I, VICTOR VON WEDELSTAEDT, a subject of the King of Prussia, and a resident of the city of Berlin, in the Kingdom of Prussia, German Empire, have invented certain new and useful Improvements in Methods of and Apparatus for Learning to Play on the Piano, of which the following is a specification.

My invention has for its object to dispense with the ordinary tedious method of learning to play the piano from the usual notes, by the use of appliances which I will proceed to describe with reference to the accompanying drawings.

The apparatus consists, first, of a transcriber of notes; secondly, of an indicator of keys, and, thirdly, of a novel kind of note-register, by means of which three parts any one without knowledge of the notes can, after a short explanation, play any piece of music transcribed on the register correctly according to sound, no matter what key it may be in.

Figure 1 of the accompanying drawings shows a part plan of a key-board with the key-indicator placed thereon. Fig. 2 shows a part front view of the key-indicator. Fig. 3 is a side view thereof, showing its position on the key-board. Fig. 4 shows the transcriber of notes; Fig. 5, the new note-register serving as a substitute for the ordinary sheet-music shown at Fig. 5ª.

For transcribing an ordinary piece of piano-music for use with the new method of instruction the sheet of music N is placed in the position shown at Fig. 4 relatively to the transcriber M, so that the projecting part $a$ of the latter, marked with five lines, corresponds with the five lines of the treble-key of the music-sheet. If any of the notes marked on the latter correspond with the lines or spaces of the transcriber, the corresponding figures, 1, 3, 5, are entered on the note-register, Fig. 5, in such manner that any two or more notes that have to be played simultaneously, and which consequently appear together at the edge of the transcriber, are marked side by side with the corresponding designations, while those that are played consecutively, and which consequently only appear consecutively as the transcriber is moved along, are entered one below the other. In the same way the bass-notes are entered by the aid of the part $b$ of the transcriber.

It will be seen that the notes on the lines of the music-sheet N are indicated by the numerals on the outer row of divisions, while those of the spaces are indicated by the numerals on the inner row of divisions.

The note-register is divided into spaces arranged horizontally side by side, each space representing an octave, the bass-octaves being separated from the treble-octaves by stronger marked lines, the two spaces between which serve for indicating those notes which have to be played in the treble-key by the bass-hand, and vice versa.

The bass or treble octaves in which the key to be struck indicated by the notes lies is shown by the long division-lines on the note-transcriber and the corresponding designation of the note is entered in the space of the note-register corresponding to that octave. Thus, by way of example, the notes of the ordinary music-sheet shown in Fig. 5ª will, after being transcribed, appear as marked at Fig. 5.

After a piece of music has been transposed in the above-described manner the student makes use of the key-indicator. (Shown at Figs. 1, 2, and 3.) This is placed against the back of the key-board, as at Figs. 1 and 3, and indicates the keys of each octave with the numbers 1 to 12, the figures 10, 11, and 12 being indicated, respectively, by 0, 1, and 2.

The signs for the keys can be marked on the small projections S S, or upon the vertical part above each note. The signs for the octaves I-bass, I-treble are marked on the projections $t$ between the octave boundaries. The octaves of the key-board are indicated by the vertical and horizontal tongues Z of the key-indicator. The tongues that mark the division between the bass and treble octaves are made somewhat larger than the others. This boundary is indicated on the note-register, Fig. 5, by stronger marked lines. For indicating the value of each note a special method is employed, which is, however, immaterial for the present invention.

In using the several above-described parts of the improved apparatus for learning to play on the piano, the student can easily play any piece of music without a knowledge of the notes, as by means of the transcriber the notes of the composition are indicated by figures and spaces on the note-register, and the keys to be struck are indicated by corresponding figures and tongues on the key-indicator.

Having thus described the nature of my invention and the best means I know for carrying the same into practical effect, I claim—

1. The method of producing musical notation represented by numerals or characters upon a note-register by placing upon the ordinary music-staff a transcribing device consisting of a sheet or plate having columns registering with the lines of the music-staff and marked with numerals or characters, and then marking upon a note-register consisting of a sheet or plate having columns similar to those of the transcribing device the numerals on the latter that correspond with the notes marked on the music-staff, substantially as herein described.

2. A transcribing device for transcribing the notes of the ordinary music-staff into values represented by numerals or characters, consisting of a sheet or plate having divisions or columns that range with the lines of the music-staff, such columns or divisions being marked by numerals or characters, so that the notes on the music-staff are represented by the said numerals or characters, substantially as herein described.

3. A note-register for indicating the notes of the ordinary music-staff by numerals or characters and divisions, consisting of a sheet or plate having a set of vertical columns indicating the several treble-octaves separated by a space from a set of columns representing the several bass-octaves, and having horizontal divisions in which are marked the numerals or characters representing the notes of the music that occur in each octave, substantially as herein described.

4. The combination of a note-register having vertical columns indicating the treble and bass octaves, and horizontal divisions in which are marked numerals or characters representing the notes of the ordinary music-staff, and a key-indicator consisting of a plate to be placed upon the key-board of a piano, having divisions or projections corresponding to the several keys, and other divisions or projections corresponding to the several octaves, the divisions for the notes and those for the octaves being marked with letters or characters the same as those marked on the note-register, so that each key and each octave of the key-board are thereby indicated by the same numeral or character as that contained on the note-register, substantially as herein described.

In testimony that I claim the foregoing as my invention I have signed my name in presence of two subscribing witnesses.

VICTOR VON WEDELSTAEDT.

Witnesses:
 M. W. WILRICH,
 B. ROI.